7045X
J. DUDLEY.
Plow.
Patented May 8, 1832.
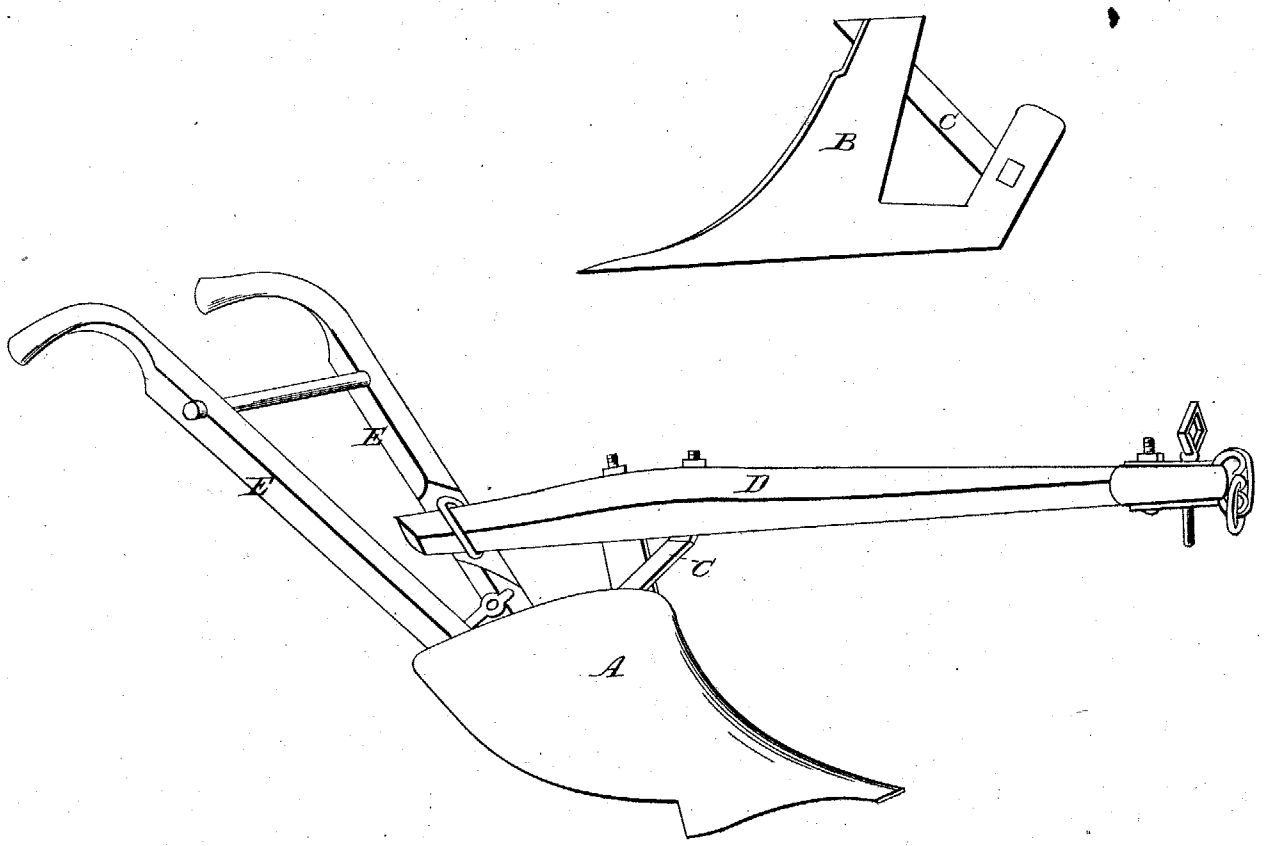
N. PETERS, PHOTO-LITHOGRAPHER, WASHINGTON, D. C.

7045X

UNITED STATES PATENT OFFICE.

JOSEPH DUDLEY, OF FLEMING COUNTY, KENTUCKY.

IMPROVEMENT IN PLOWS.

Specification forming part of Letters Patent dated May 8, 1832.

*To all whom it may concern:*

Be it known that I, JOSEPH DUDLEY, of the county of Fleming and State of Kentucky, have invented a new and useful Improvement in Plows; and I do hereby declare that the following is a full and exact description of the construction of said plow as invented and improved by me.

The share and mold-board are all in one piece, and the landside is formed with an upright bar, that is attached to it near the point of welding, so as to form a regular circle from the point of the landside up the upright bar high enough to receive the front of the share. The share is attached to it by welding. The upright then passes straight up through the beam, and is secured by a screw and tap on the top of the beam. It is further secured by a brace that passes from the heel-screw across the upright bar about two inches below the beam, where it is secured by a short bolt that passes through the upright bar and brace, with a screw and tap on it. The brace then passes on through the beam, and is secured on top of the beam with a screw and tap, all of it made of wrought or rolled iron. The heel is made straight with the outside of the landside-bar and long enough from the turn to extend eight or nine inches up the handle, with the head of the heel-screw countersunk level with the bar.

JOSEPH DUDLEY.

Witnesses:
J. M. STOCKWELL,
JAMES BRUCE.